United States Patent
Kapaldo et al.

(10) Patent No.: US 11,933,366 B2
(45) Date of Patent: Mar. 19, 2024

(54) CONNECTING ROD FAILURE DETECTION SYSTEM AND METHOD

(71) Applicant: International Engine Intellectual Property Company, LLC, Lisle, IL (US)

(72) Inventors: Daniel Joseph Kapaldo, Oak Forest, IL (US); Mark Brian Michelotti, Buffalo Grove, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/889,721

(22) Filed: Aug. 17, 2022

(65) Prior Publication Data
US 2024/0060529 A1    Feb. 22, 2024

(51) Int. Cl.
*F16C 9/00* (2006.01)
*F16C 9/04* (2006.01)
*F16C 41/00* (2006.01)

(52) U.S. Cl.
CPC .............. *F16C 9/04* (2013.01); *F16C 41/007* (2013.01); *F16C 2360/22* (2013.01)

(58) Field of Classification Search
CPC .......... F16C 7/06; F16C 7/00; F16C 2360/22; F02D 2200/101; F02D 41/1441; F02D 41/1438; F02D 19/025; F02P 5/152
See application file for complete search history.

(56) References Cited

U.S. PATENT DOCUMENTS 4,424,709 A * 1/1984 Meier, Jr. ............ G01M 15/106
                                                           73/114.25
4,730,484 A * 3/1988 Olschefski ............. G01N 29/14
                                                           73/660

(Continued)

FOREIGN PATENT DOCUMENTS

CN         112129533 A     12/2020
DE    102015107738 A1 *   11/2016

(Continued)

OTHER PUBLICATIONS

DE 102015107738 A1 English translation (Year: 2016).*
International Search Report and Written Opinion for PCT/US2023/027714, dated Oct. 24, 2023 (10 pages).

*Primary Examiner* — George C Jin
*Assistant Examiner* — Teuta B Holbrook
(74) *Attorney, Agent, or Firm* — Mark C. Bach; Umang Khanna

(57) ABSTRACT

Disclosed herein are embodiments of method for detecting degradation of a connecting rod big end bearing within an internal combustion engine including a crankshaft and an exhaust manifold included on a vehicle. A method includes providing an electronic control unit connected with the engine, a first set of sensors for detecting crankshaft acceleration connected located adjacent the crankshaft, a second set of sensors for detecting engine exhaust manifold pressure located adjacent the engine exhaust manifold, and a display component and an auditory component connected with the electronic control unit. The display component and/or the auditory component is activated when the first set of sensors detects diminished crankshaft acceleration during a power stroke compared to prior acceleration of the crankshaft during a power stroke and the second set of sensors detects exhaust manifold pressure that does not vary statistically significantly from expected exhaust manifold pressure.

3 Claims, 1 Drawing Sheet

(56) References Cited

U.S. PATENT DOCUMENTS

| | | | | |
|---|---|---|---|---|
| 5,848,372 A | * | 12/1998 | Ito | G01M 15/10 |
| | | | | 701/111 |
| 6,481,269 B2 | * | 11/2002 | Maruta | G01M 15/106 |
| | | | | 73/114.37 |
| 6,651,490 B1 | * | 11/2003 | Ceccarani | G01M 15/11 |
| | | | | 73/114.74 |
| 11,226,264 B2 | * | 1/2022 | Shurkewitsch | G01L 23/24 |
| 2017/0122246 A1 | * | 5/2017 | Ottikkutti | F02D 41/401 |
| 2019/0234324 A1 | | 8/2019 | Schmidt | |
| 2022/0010744 A1 | | 1/2022 | Chen | |

FOREIGN PATENT DOCUMENTS

| | | | | |
|---|---|---|---|---|
| EP | 0203910 B1 | * | 4/1991 | |
| JP | H06 137164 A | | 5/1994 | |
| JP | 2008208751 A | * | 9/2008 | |
| NO | 319831 B1 | * | 9/2005 | F02D 41/1448 |

* cited by examiner

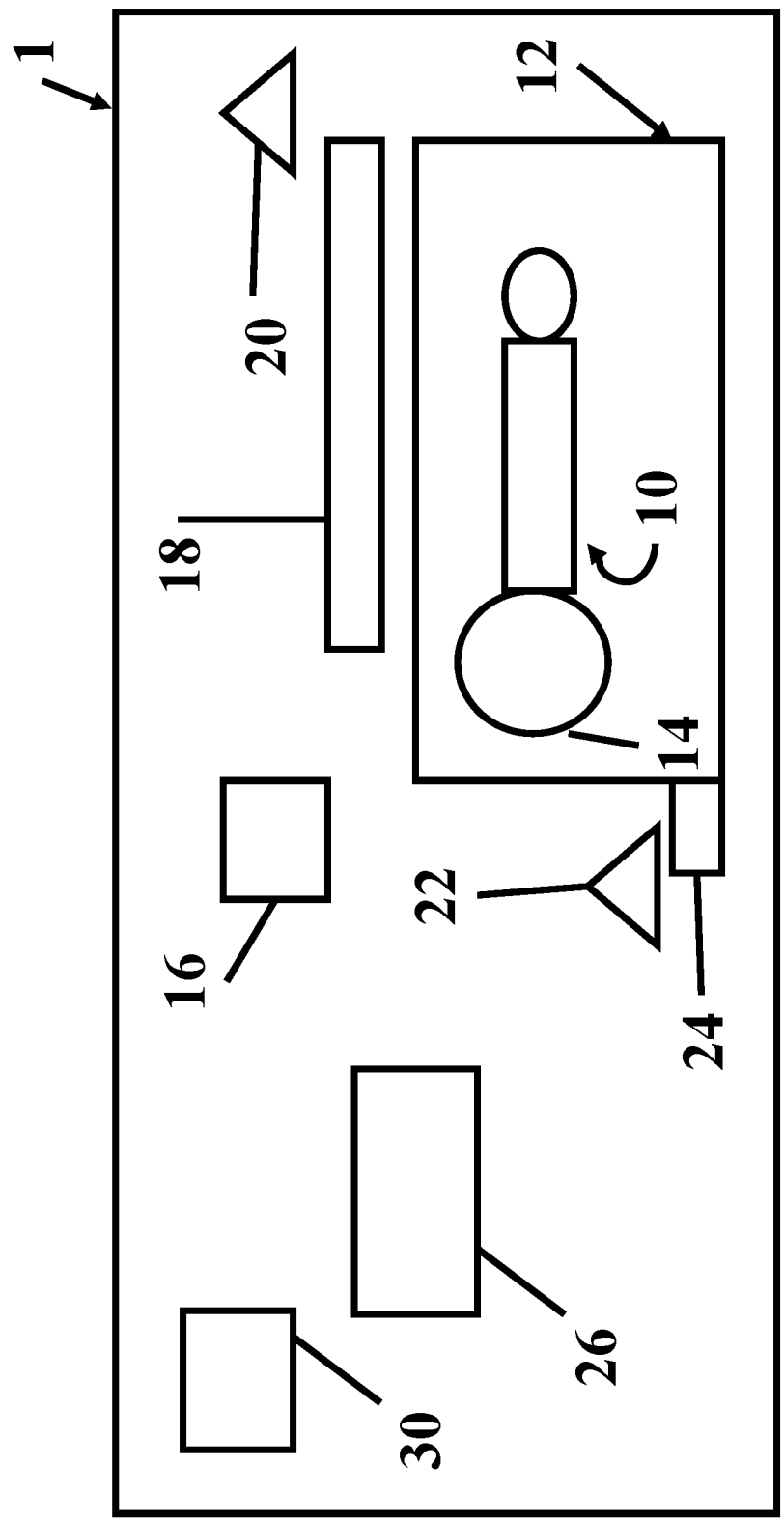

CONNECTING ROD FAILURE DETECTION SYSTEM AND METHOD

TECHNOLOGICAL FIELD

The present disclosure relates to systems and methods for detecting connecting rod failure in an internal combustion engine.

BACKGROUND

Degradation of connecting rod big end bearings in internal combustion engines, such as spark ignition engines, compression ignition engines and the like, may cause engine failure. Such engine failure may present hazards for, by way of example, a driver of an internal combustion engine vehicle and for passengers in the vehicle. This is especially so when the driver does not have time sufficient to direct the vehicle out of traffic and turn the engine off.

A cause of connecting rod big end bearing degradation and failure is insufficient oil lubrication between the connecting rod big end bearing and an associated crankpin journal.

Existing ways by which an operator of a device comprising an internal combustion engine (or other engine) may be forewarned of connecting rod big end degradation include engine power reduction as well as auditory cues, namely what is commonly described as a knocking sound. The knocking sound in such instances results from there being additional space between the connecting rod big end bearing and the associated crankpin journal and, as a consequence, too much movement of the connecting rod big end around the associated crankpin journal.

By the time that this knocking sound is audible, however, the connecting rod may have already sustained substantial damage. Costs associated with repairing a connecting rod damaged in this manner may be substantial. Further, a connecting rod damaged in this manner, if not promptly detected and addressed, may cause damage to a corresponding crankpin journal and crankshaft, as well as damage to adjacent connecting rods and pistons. If not detected and addressed, substantial degradation of the connecting rod big end bearing of a connecting rod may even cause catastrophic engine failure.

It is desirable to provide systems and methods that include sufficient detection of, and adequately alert an operator to connecting rod big end bearing degradation and associated risk of engine damage and failure.

SUMMARY

Disclosed herein are embodiments of system and embodiments of method for detecting degradation of a connecting rod big end bearing within an internal combustion engine including a crankshaft and an exhaust manifold included on a vehicle. According to one embodiment, a system comprises an electronic control unit connected with the engine. A first set of sensors for detecting crankshaft acceleration is connected with the electronic control unit and is located adjacent the crankshaft. A second set of sensors is connected with the electronic control unit and is located adjacent the engine exhaust manifold. A display component is disposed on the vehicle and connected with the electronic control unit. An auditory component is disposed on the vehicle and connected with the electronic control unit.

An embodiment of a method for detecting degradation of a connecting rod big end bearing within an internal combustion engine including a crankshaft and an exhaust manifold included on a vehicle includes providing an electronic control unit connected with the engine disposed on the vehicle. Providing a first set of sensors for detecting crankshaft acceleration connected with the electronic control unit and located adjacent the crankshaft. Providing a second set of sensors for detecting engine exhaust manifold pressure connected with the electronic control unit and located adjacent the engine exhaust manifold. Providing a display component and an auditory component disposed on the vehicle connected with the electronic control unit. Activating the display component and/or the auditory component when the first set of sensors detects diminished crankshaft acceleration during a power stroke compared to prior acceleration of the crankshaft during a power stroke and the second set of sensors detects exhaust manifold pressure that does not vary statistically significantly from expected exhaust manifold pressure.

BRIEF DESCRIPTION OF THE DRAWINGS

FIG. 1 is a representation of an internal combustion engine comprising embodiments of a system and embodiments of a method for detecting degradation of a connecting rod described herein.

DETAILED DESCRIPTION

The following disclosure concerns a vehicle 1, such as a trailer tractor, a truck, a car, a motorcycle, a locomotive, a water vehicle such as a boat, a submarine and the like, an aircraft and the like, including embodiments of a system and embodiments of a method for detecting degradation of a connecting rod 10 within an internal combustion engine 12, and for providing an associated alert to connecting rod 10 degradation.

For purposes of clearly describing components, features, and method steps discussed throughout this disclosure, some frequently used terms will now be defined. The term "power stroke," as it is used throughout this disclosure, means a stroke of a piston in an internal combustion engine during which an associated piston is propelled toward a crankshaft by pressure generated by ignition of a fuel-air mixture. The term "normal," as it is used throughout this disclosure, denotes absence of statistically significant variation from expected.

A cause of degradation of connecting rod bearing degradation is insufficient oil lubrication between the connecting rod big end bearing and an associated crankpin journal. Degradation of the connecting rod big end bearing may lead to damage of the connecting rod big end bore, damage to the crankpin journal, and potentially cracking of the connecting rod. If not addressed, degradation of the connecting rod big end bearing 14 of a connecting rod 10 may even cause engine failure.

Decreased engine performance caused by degradation of a connecting rod big end bearing 14 may be reflected in crankshaft engine speed. Degradation of a connecting rod large big end bearing 14 may result in diminished crankshaft acceleration during power stroke of a piston connected with the connecting rod 10 comprising the degraded connecting rod big end bearing 14. Analytical methods for detecting fuel injection misfires in an internal combustion engine 12 may be used to detect diminished crankshaft acceleration due to connecting rod big end bearing 14 degradation.

While both a misfire and a degraded connecting rod big end bearing 14 may be substantially similar with respect to associated diminished crankshaft acceleration during a power stroke, a misfire and a degraded connecting rod big end bearing 14 may be differentiated from one another based on data concerning engine exhaust manifold pressure.

When diminished crankshaft acceleration has been caused by degradation of connecting rod big end bearing 14, fuel is still combusting normally. Thus, the connecting rod big end bearing 14 degradation does not cause changes in engine exhaust manifold pressure. By contrast, when diminished crankshaft acceleration during a power stroke has been caused by a fuel injection misfire, a momentary decrease in exhaust manifold pressure may be observed.

Referring to FIG. 1, disclosed herein is a vehicle 1 including embodiments of system and embodiments of method for detecting degradation of a connecting rod big end bearing 14 within an internal combustion engine 12 and for providing an associated alert to connecting rod 10 degradation. Systems enabled by the present disclosure may comprise an electronic control unit (ECU) 16 operatively connected with the internal combustion engine 12 disposed on the vehicle 1.

An embodiment comprises a first set of sensors 20 for detecting crankshaft 18 acceleration. This first set of sensors 20 may be communicatively and operatively connected with the ECU 16. This first set of sensors 20 may be located adjacent the crankshaft 18 of an internal combustion engine 12.

An embodiment may comprise a second set of sensors 22 for detecting engine exhaust manifold pressure. This second set of sensors 22 may be communicatively and operatively connected with the ECU 16. The second set of sensors 22 may be located adjacent an engine s 24.

An embodiment may comprise a display component 26 disposed on the vehicle 10 in any location accessible by a driver of the vehicle 10. The display component 26 may be operatively connected with the ECU 16. As described further below, the display component 26 may be configurable to transmit visual alert to connecting rod 10 degradation when activated. In some embodiments, the ECU 16 may send an appropriate signal, wired or wirelessly, to the display component 26 resident locally, such as to a smartphone used by a driver of the vehicle 1 and the like, or remotely, such as to a fleet manager, a repair facility and the like, to the vehicle 1, An embodiment may comprise an auditory component 28, such as a longitudinal wave emitter, e.g. a speaker and the like, disposed at an appropriate location on the vehicle 1. The auditory component 28 is operatively connected with the ECU 16. As described further below, the auditory component 28 may transmit a longitudinal wave, e.g. an auditory signal, when activated.

In an embodiment, at least one of the display component 26 and the auditory component 28 may be activated by the ECU 16 upon receipt by the ECU 16 of a signal indicating that two conditions are met simultaneously: (i) the first set of sensors 20 detects diminished crankshaft 18 acceleration of a degrading cylinder comprising the internal combustion engine 14 during a power stroke of that degrading cylinder compared to acceleration of the same crankshaft 18 of other cylinders comprising the same internal combustion engine 14 during the same power stroke at a given speed of the internal combustion engine 14; and (ii) the second set of sensors 22 detects exhaust manifold pressure that does not deviate from nominal exhaust pressure data previously collected from nominal running internal combustion engines similar to the internal combustion engine 14. Deviation of exhaust manifold pressure measured by the second set of sensors 22 is statistically significant from the nominal exhaust pressure data. In some embodiments, at least one of the display component 26 and the auditory component 28 may not be activated unless and until the preceding two conditions are met simultaneously for a period comprising one of at least 1 minute, 1 minute and 30 seconds, and 2 minutes.

When activated, visual alert to connecting rod 10 degradation transmitted by the display component 26 may comprise an electromagnetic wave emitter, such as a red light, a white light, a green light, and color light that stands out sufficiently so as to be noticed by an operator of the vehicle 1 or other device comprising an internal combustion engine 12. Such electromagnetic wave emitter may be intermittently activated, i.e. blinking. Such intermittent activation may increase in frequency in a manner substantially proportional to a time period during which the two preceding conditions are met simultaneously.

Embodiments disclosed and described herein may be utilized in connection a methods for mitigating risk of premature failure of an internal combustion engine 12.

According to another embodiment, the auditory component 28 may emit a longitudinal wave having a volume and a pitch. At least one of the volume and the pitch can vary proportionally to duration during which the two previous conditions are met simultaneously.

When an embodiment disclosed herein is implemented in a preexisting vehicle 1, such implementation may be effectuated by way of a software update to an existing ECU 16. The existing ECU 16 may receive data concerning crankshaft 18 acceleration during a power stroke through a signal transmitted by the first set of sensors 20. The existing ECU 16 may further receive data concerning engine exhaust manifold pressure through signals transmitted by the second set of sensors 22.

In some embodiments, the vehicle 1 includes an instrument cluster 30 controlled by the ECU 16. The instrument cluster 30 may receive, analyze and display data concerning crankshaft 18 acceleration during a power stroke and concerning engine exhaust manifold pressure. Upon receipt of such data, the ECU 16 may analyze whether the crankshaft 18 acceleration has diminished during a power stroke. In analyzing whether there has been a diminution of crankshaft acceleration during a power stroke, the ECU 16 may analyze whether there has been a decrease in average acceleration exhibited during a defined period for a substantially in-tact connecting rod 10 and connecting rod big end bearing 14 of that substantially in-tact connecting rod 10 under substantially similar operational and environmental parameters.

Upon receipt of data from the second set of sensors 22, the ECU 16 may analyze whether engine exhaust manifold pressure is normal, i.e. detected exhaust manifold pressure does not vary statistically significantly from expected exhaust manifold pressure. In analyzing whether engine exhaust manifold pressure is normal, the ECU 16 may analyze whether there has been any statistically significant variation in engine exhaust manifold pressure. Upon receipt of data from the first set of sensors 20 and the second set of sensors 22, and after having performed analyses outlined above, the ECU 16 may then analyze whether, at any point in time, there was both a diminution of crankshaft acceleration during a power stroke and normal engine exhaust manifold pressure simultaneously. If these two conditions are met simultaneously, the ECU 16 may transmit a command signal to at least one of the display component 26 and the auditory component 28 to activate at least one of the display component 26 and the auditory component 28. At least one of the display component 26 and the auditory component 28 may be associated with the instrument cluster 30. The ECU 16 may be programmable to transmit a signal to the display component 26 that may cause the display component 26 to transmit an alert, such as a light and the like, to connecting rod 10 degradation. The ECU 16 may be programmable to transmit a signal to the auditory component 28 such that the auditory component 28 transmits an auditory signal.

Embodiments of systems and methods described herein may be used in connection with, not only internal combustion engine vehicles, but any device or piece of equipment comprising an internal combustion engine having a crankshaft speed sensor and exhaust manifold pressure sensor. In additional to an embodiment disclosed herein may be used, sometimes with appropriate modification, with another device, such as a chainsaw, a lawnmower, a generator and the like. An element of one embodiment may be combined with an element of another embodiment to arrive at an additional embodiment.

What is claimed is:

1. A method for detecting degradation of a connecting rod big end bearing within an internal combustion engine including a crankshaft and an exhaust manifold included on a vehicle, the method comprising the steps of:
   providing an electronic control unit operatively connected with the internal combustion engine disposed on the vehicle;
   providing a first set of sensors for detecting crankshaft acceleration operatively connected with the electronic control unit and located adjacent the crankshaft of the internal combustion engine;
   providing a second set of sensors for detecting engine exhaust manifold pressure, operatively connected with the electronic control unit and located adjacent the engine exhaust manifold;
   providing a display component disposed on the vehicle operatively connected with the electronic control unit;
   providing an auditory component disposed on the vehicle operatively connected with the electronic control unit;
   activating at least one of the display component and the auditory component when the first set of sensors detects diminished crankshaft acceleration during a power stroke compared to prior acceleration of the crankshaft during a power stroke and the second set of sensors detects exhaust manifold pressure that does not vary statistically significantly from expected exhaust manifold pressure.

2. The method of claim 1 wherein the display component comprises an electromagnetic wave emitter, and further comprising the step of:
   intermittently activating the electromagnetic wave emitter.

3. The method of claim 1, wherein the auditory component comprises a longitudinal wave emitter, and further comprising the step of:
   varying at least one of volume and pitch of a longitudinal wave emitted by the longitudinal wave emitter.

* * * * *